May 26, 1959 A. E. ZIERICK 2,887,847
HYDRAULIC CLUTCH AND TURBINE DRIVE
Filed Sept. 16, 1954 5 Sheets-Sheet 1

INVENTOR
Ambrose E. Zierick

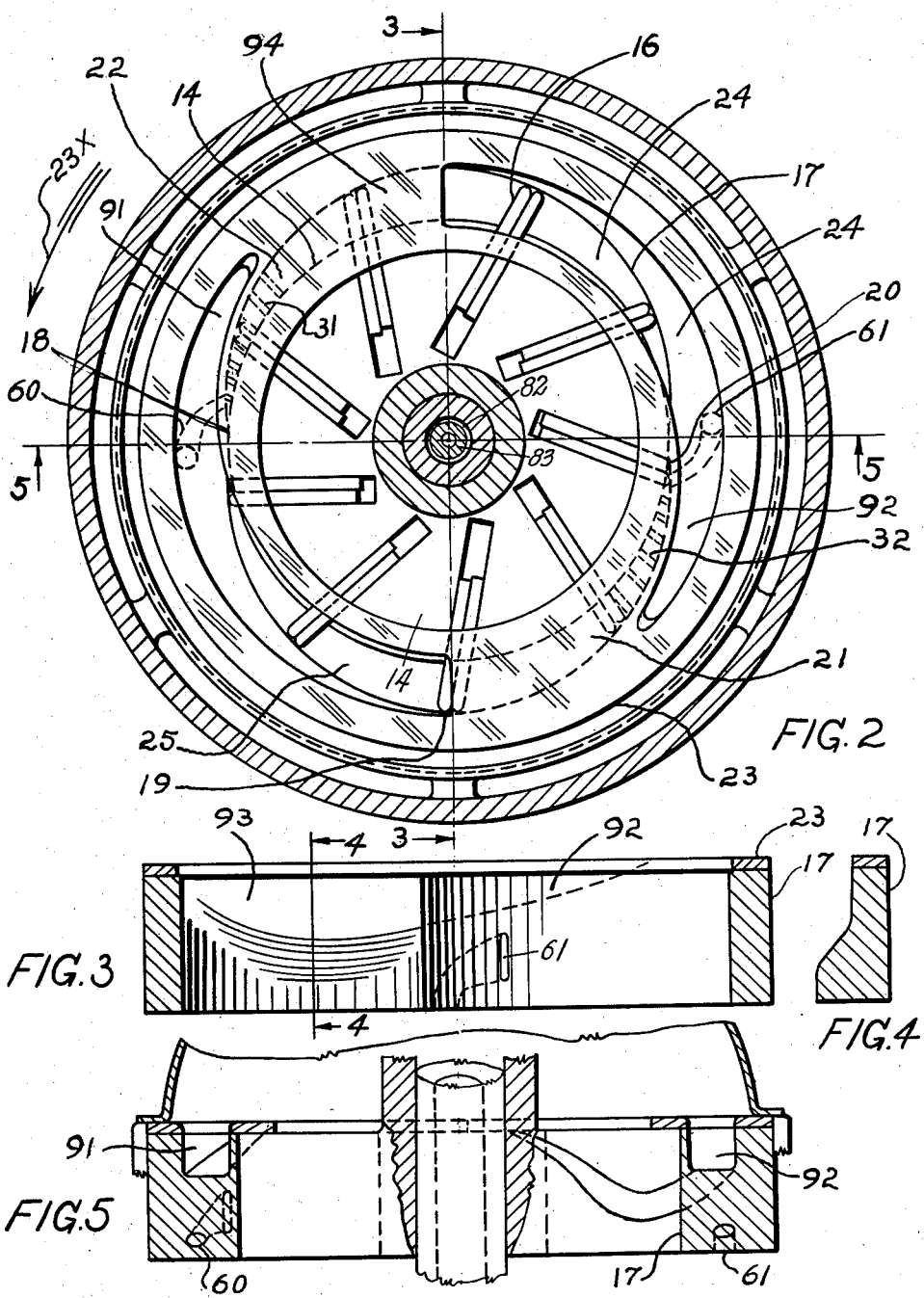

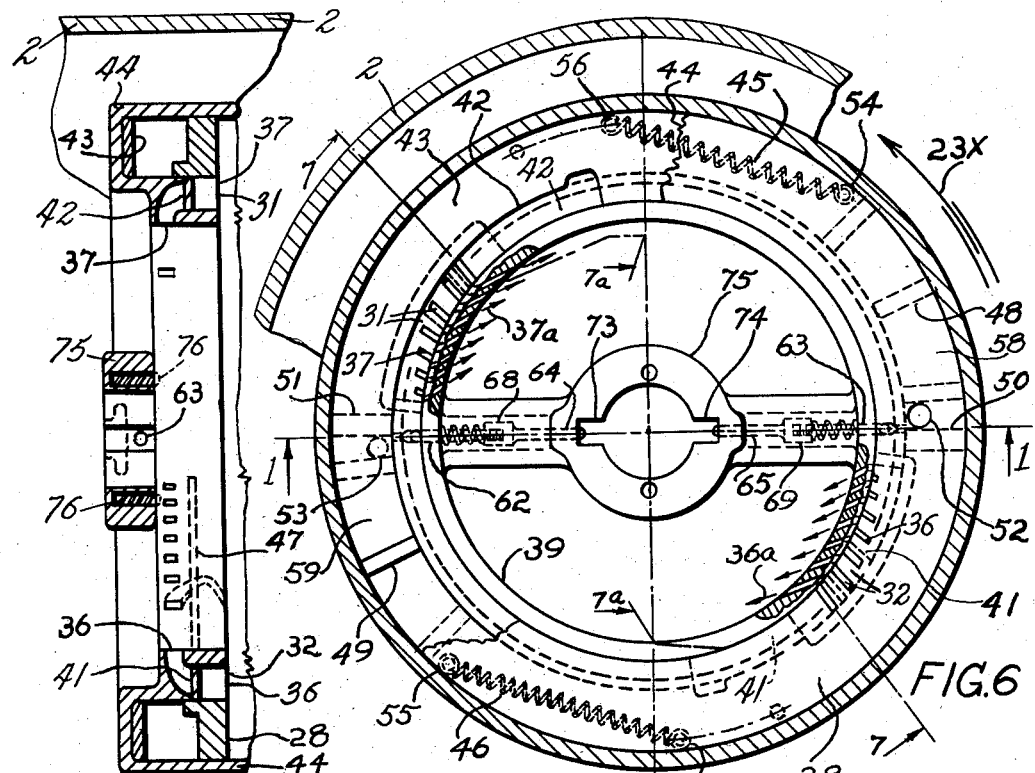

May 26, 1959 A. E. ZIERICK 2,887,847
HYDRAULIC CLUTCH AND TURBINE DRIVE
Filed Sept. 16, 1954 5 Sheets-Sheet 4
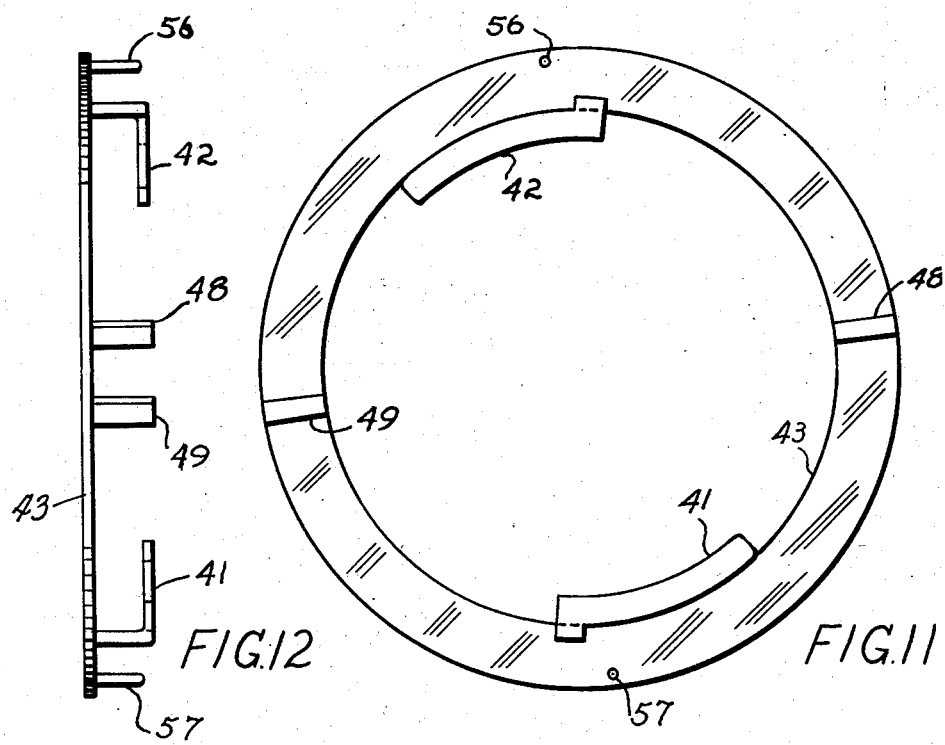
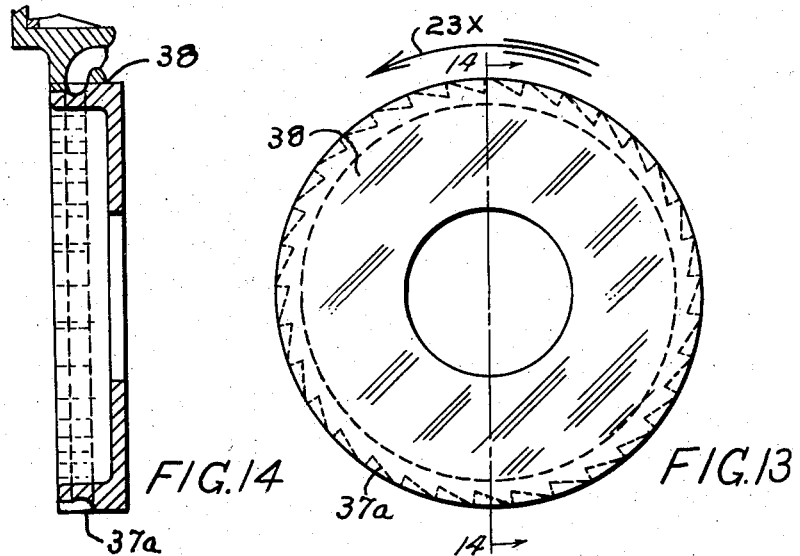
INVENTOR
Ambrose E. Zierick May 26, 1959     A. E. ZIERICK     2,887,847
HYDRAULIC CLUTCH AND TURBINE DRIVE Filed Sept. 16, 1954     5 Sheets-Sheet 5

INVENTOR
Ambrose E. Zierick

United States Patent Office 2,887,847
Patented May 26, 1959

2,887,847

HYDRAULIC CLUTCH AND TURBINE DRIVE

Ambrose E. Zierick, Bronx, N.Y.

Application September 16, 1954, Serial No. 456,385

8 Claims. (Cl. 60—54)

My invention relates to certain new and useful improvements in hydraulic clutch and turbine drive in which the output speed of the driven element is varied by finger tip control means in which the torque increases as the speed decreases.

An object is to provide a power transmission by fluid pressure in which the torque increases as the speed decreases.

Other purposes and objects are to provide automatic power transmission for many services and particularly for motor cycles, automobiles, material and freight vehicles, machinery and machine tools and many other operations and devices to which it is suited or for which it may be adapted.

An object is to provide a power transmission, the speed and torque of which is easily changed while in operation.

I accomplish these and other objects by the construction herein described and shown in the accompanying drawings which form a part of this, my disclosure.

In the drawings:

Fig. 2 is a transverse section at 2—2, Fig. 1.

Fig. 3 is a section at 3—3, Fig. 2, of the cam ring.

Fig. 4 is a section taken at 4—4, Fig. 3, of the cam ring.

Fig. 5 is a section of the cam ring at 5—5, Fig. 2.

Fig. 6 is a transverse section at 6—6, Fig. 1.

Fig. 7 is a fragmentary section of the inner housing and turbine ring at 7—7, Fig. 6, diverging at 7a—7a.

Fig. 8 is a fragmentary section at 8—8, Fig. 9.

Fig. 9 is an elevation of the turbine ring as seen at the section line 6—6, Fig. 1.

Fig. 10 is a section at 10—10, Fig. 9.

Figs. 11 and 12 are elevations of the gates and gate operating ring.

Fig. 13 is an elevation of the turbine reactor ring detached from the rotor.

Fig. 14 is a vertical section at 14—14, Fig. 13.

Similar reference characters refer to similar parts throughout the several views of the drawings and specification to follow:

Figure 1:
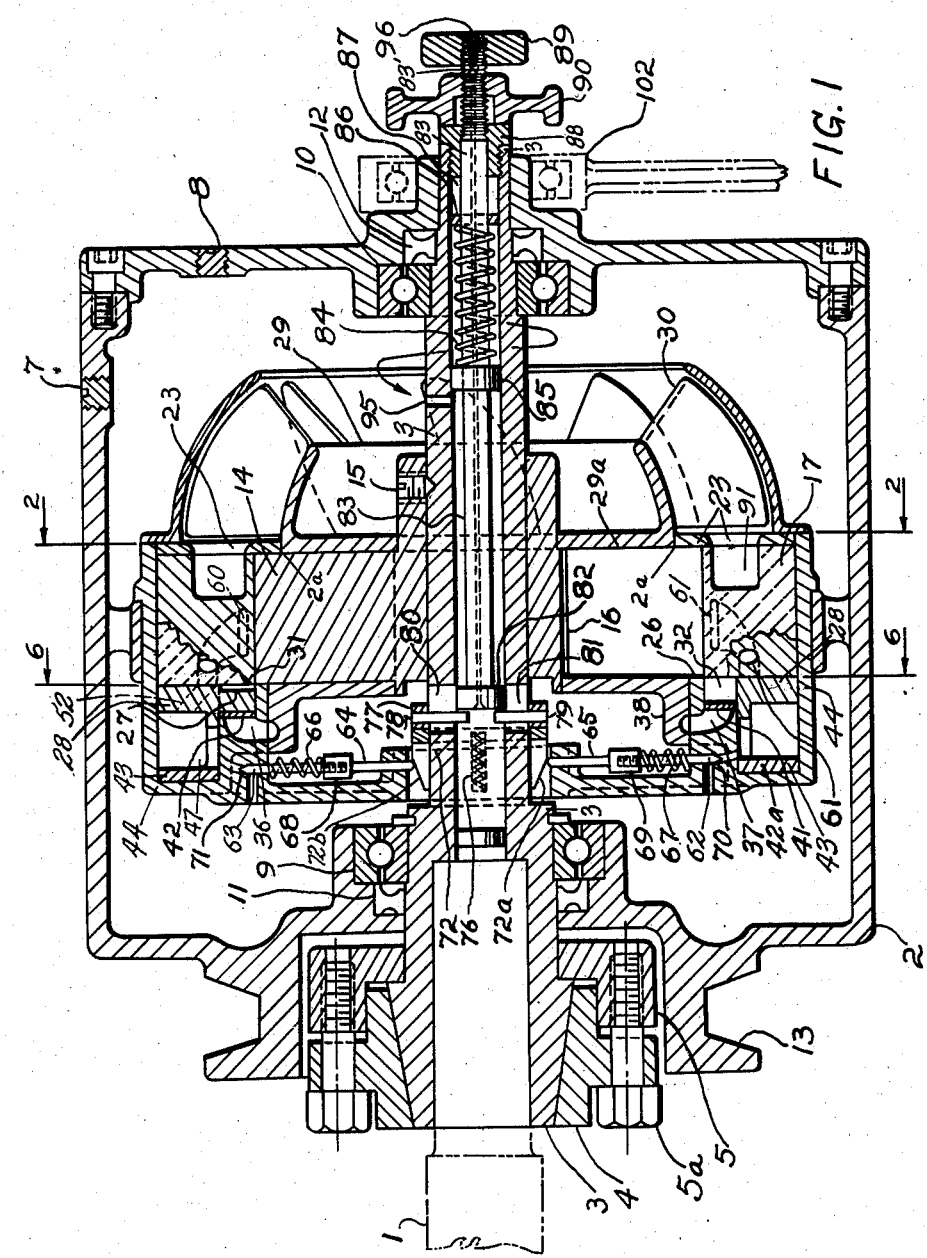
Fig. 1 is a vertical section along the axis of rotation, and diverging from the vertical center line to show certain ports and vanes.
Figures 15, 16:
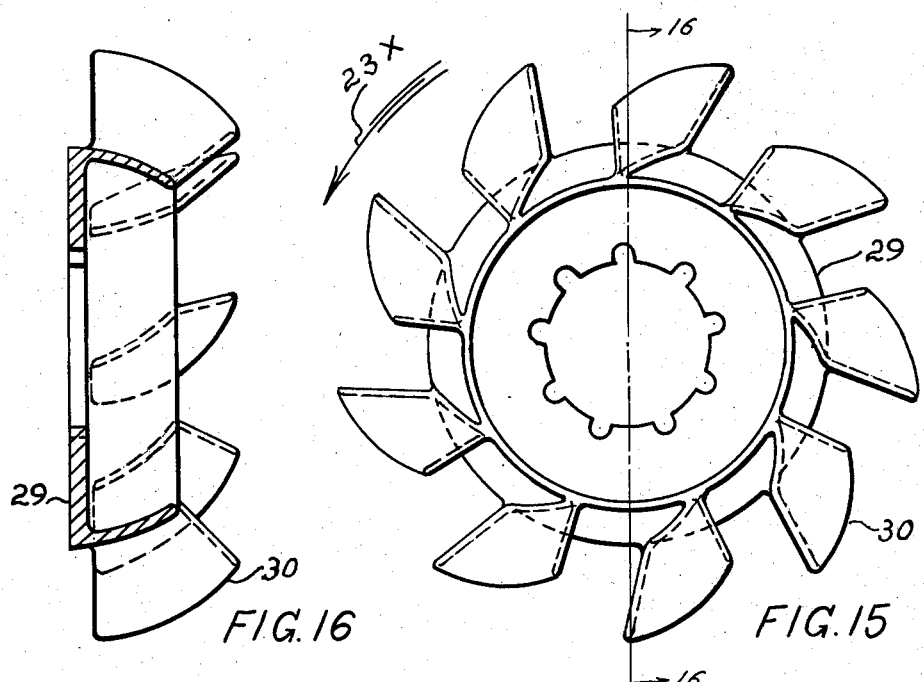
Fig. 15 is an elevation of the scoop impeller wheel.
Fig. 16 is a vertical section at 16—16, Fig. 15.
Figures 17, 18:
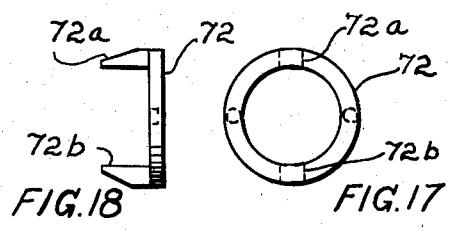
Fig. 17 is an elevation, facing the rotor, of the sliding collar and inclined tongues.
Fig. 18 is a side elevation of the sliding collar and inclined tongues.

The drive shaft 1 supports a hydraulic vessel 2 which is rotatively carried on a spindle 3, through ballbearings 9 and 10. The drive shaft 1 and the spindle 3 are securely fastened by external collet 4 and the flange 5 or otherwise.

The hydraulic vessel 2 is normally over half full of hydraulic fluid injected through screw plug 7, the level of which is controlled by overflow plug 8.

It will be seen that the spindle 3 rotates in fixed relationship with drive shaft 1, and its rotation is at times in a variable relation to the hydraulic vessel 2 which thus rotates around the spindle and in the ballbearings 9 and 10 as controlled by the hydraulic fluid, leakage to the atmosphere being prevented by the retainers 11 and 12.

The hydraulic vessel 2 has for its function to transmit the input power torque derived from drive shaft 1 to the V pulley or other suitable power take-off means to provide torque after it has been converted into the speed which may have been selected, as hereinafter more fully described.

The rotor 14 is secured to the spindle by the screw or other securing means 15 and is provided with the radially slidable vanes 16 restricted in movement by the cam ring 17, and held in contact by centrifugal force, the contact surfaces of the ring being smooth and hard. The radial movement of vanes 16 is restricted by cam ring 17 to make two complete cycles, each cycle as when traveling from point 18 to point 19, the out position, and in again at point 20 to begin another cycle. The chambers 21 and 22 thus formed between the rotor, vanes and cam ring are first filled with liquid which is then compressed to cause the hydraulic vessel, which is secured to ring 17, and the power take-off 13 to transmit power which is regulated and controlled to provide the torque and at the speed, as desired.

Figure 19:
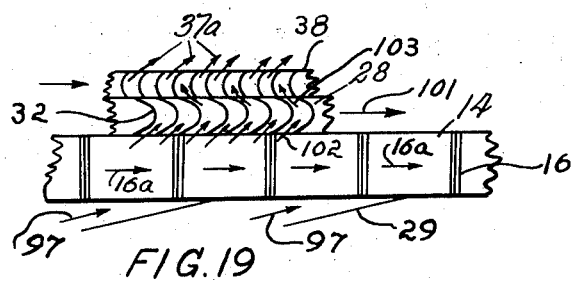
Fig. 19 is a diagrammatic view showing the direction of forces of the moving parts by arrows.

To insure fully filling the chambers 21 and 22 I have provided the scoop impeller 29 comprising scoop blades 30, one of which is in register with each of the vanes 16 in the rotor 14 to which the impeller is secured and with which it rotates to force the liquid media through the ports 24 and 25 in the port disc 23 which cooperates with the impeller 29, at the control end of the rotor to prevent axial movement of the vanes which are prevented from axial movement at the drive side of the rotor by the turbine ring 28 with its wall areas 26 and 27 and its turbine duct areas 31 and 32 which are controlled by the gates 41 and 42 to regulate the discharge of the chambers 21 and 22 and the flow of liquid through the areas 31 and 32 from whence the liquid media flows axially then radially inwardly through the ducts or turbine blades 36 and 37 in the inner housing 44 which is secured to and travels with the vessel 2 and power take off 13. The liquid media then flows radially inwardly through the turbine blading and reaction ducts 37a in the periphery of the turbine wheel 38 into the liquid media of the vessel 2 where it again is scooped up to be again used over, the flow being blocked or regulated by the gates 41 and 42. The turbine wheel is fixed to and rotates with the rotor, the other turbine blading as above described rotates with the vessel 2, the general flow may be followed by referring to the arrows, Fig. 19, a diagram in which all passages are shown on a common plane, an axial plane.

The rotation of the parts secured to the rotor 14 and also the parts secured to the vessel 2 and power take off 13, is counterclockwise, looking from the regulator screw end toward the drive shaft end, or from the right as seen in Fig. 1 of the drawings. The direction of flow of the liquid medium into and out of the turbine ducts is shown by the arrows 102, 103 and 37a, Fig. 19 of the drawings, and the outflow, Fig. 6, is shown by the arrows 37a and 36a which indicate a momentary reversal of flow of the liquid medium, thus reacting to apply an accelerating force on the wheel 28 and on the parts secured to the power take-off 13 and the parts in which the ducts 31 and 32 are located, thus to effect a speed change between the speed of the drive shaft and rotor and the speed of vessel 2 and power take off 13.

The relative difference in speed of the drive and take off is controlled by the gates 41 and 42 which are moved in relation to the ducts 31 and 32 to open or close them to the desired degree to change the pressure in the chambers 21 and 22. The gates 41 and 42 are secured to the gate operating ring 43 which is rotated in one direction by the springs 45 and 46 and in the opposite direction by the pistons 48 and 49 which are secured to the ring 43 and the gates 41 and 42. The pistons cooperate with the heads 50 and 51 secured to the turbine ring 28 to overcome the springs 45 and 46, one end of which is secured to the ring 43 and the other end to the ring 28, each spring having its respective securement 56 and 57 on the ring 43 and the securement 54 and 55 on the ring 28.

The springs 45 and 46 hold the gates normally closed and the pistons relatively close to their respective heads in readiness to receive liquid from the ports 52 and 53 into the annular pressure chambers 47 and 47a to force the pistons to move the ring 43 to force the pistons away from their respective heads to open the gates. The ports 52 and 53 are connected to the pressure chambers 21 and 22 by the ducts 60 and 61 thus it will be seen that a balance is effected between the tension of the springs and pressure which effects the opening and closing of the gates which in turn increases or decreases the pressure in the pressure chambers 21, 22, 47 and 47a. This balance and relationship, however, is changed by relief valves 62 and 63 which are connected by the ports 70 and 71 which are connected to the chambers 47 and 47a to reduce the pressure since the ducts 60 and 61 are limited in their capacity to supply liquid between the pressure chambers they connect.

The valves 62 and 63 are moved in one direction by the springs 66 and 67 and are closed or moved in the other direction by the valve stems 64 and 65 which engage their respective cam inclines 72a and 72b which are moved by the axially slidable collar 72 to which the cams are secured and which is moved axially in one direction by the springs 76 which are overcome to move the cams in the opposite direction by the axially thrust collar 77 having inwardly disposed pins 78 and 79 to travel axially in their respective slots 80 and 81 in the hollow spindle 3 in which the spindle rod 83 is moved axially, its head 82 engaging and pushing the pins and cams to close the valves 62 and 63.

The cams 72a and 72b slidably engage the internal grooves 73 and 74 of the hub 75 of the internal housing 44 which also guides the valve stems 64 and 65 and also prevents the collar from rotation with relation to the hub and the power output 13 which usually rotates at reduced speed with relation to the drive and spindle 3 within the hollow center of which the spindle rod is moved in one direction by the spring 84 which is seated at one end on the spindle collar 85, the other end of the spring being seated against the seal washer 86 of the seal 87 which prevents leakage through the packing nut 88 and around the threaded end 83' of the spindle rod which engages the wing nut 90 and projects to the exterior of the vessel 2 to provide a moving means for the adjusting speed regulator 89 which rotates the spindle rod in the nut 90 to move the spindle rod cams and inclines 72a and 72b to open and close the valves 62 and 63 as above described to relieve the pressure in the annular chambers 58 and 59, to effect movement of the gates and to change the balance and speed ratio between the drive and the rotor in relation to the vessel and power take off, while in motion.

To provide a vent for the interior of the vessel 2 I have vent port throughout length of the spindle rod and the spring loaded vent valve 96 thus relieving air and vapor pressure to the atmosphere and preventing an inflow of air to the vessel 2. Vents 95 equalize pressure within the hollow spindle and around the spindle rod.

A reservoir of oil or liquid media is carried in the hollow cavities of the cam ring 17 as at 92 and 91 to be quickly drawn into the pressure chambers 21 and 22 in cooperation with the scoops 30.

The delicate balance between the springs and the pressure chambers, particularly as related to the operation of the gate ring 43 and the gates 41 and 42, which regulate the flow of media through the turbine ducts, all of these act as a speed governor to stabilize the speed as set by the regulator 89. For instance as the load at the power take-off is lightened the pressure is decreased on the valves 62 and 63 thus to cause the springs 66 and 67 and 45 and 46 to effect the movement of the gates by the gate ring 43 and to change the flow of medial through the turbine ducts. The reverse is true when the power take-off load is increased and thus to have the quality of a speed governor in maintaining a constant speed as set and desired.

I have not attempted to describe all possible modifications of my hydraulic clutch and turbine drive but rather to describe in detail a preferred embodiment so that the construction may be more readily followed by one skilled in the art to which my invention pertains. A study of this disclosure may suggest numerous modifications. The preciseness of the detailed description and the preciseness of the drawings is not intended to limit the scope of my invention which is set forth in the claims to follow.

What I claim as new and desire to secure by Letters Patent is set forth as follows, the claims being numbered.

I claim:

1. In a power transmitting device having a hydraulic vessel and a power take-off connected therewith and drive means for rotating said vessel, a cam carried by said vessel, a rotor within said vessel slidable radial vane members in said rotor moved by said cam, side walls, one on each side of and adjacent said rotor and carried by said vessel, one side wall having turbine reaction ducts for discharging liquid, and the other side wall having ports for admitting liquid from said vessel to said rotor, said cam, said vanes, said rotor and said turbine reaction ducts forming pressure chambers, and valve gate means for opening and closing said discharge turbine ducts, whereby a flow of liquid is discharged from said pressure chambers through said turbine ducts in one side wall, and said gate means being movable about the axis of said rotor to open or close all or a part of said ducts, and spring means for moving said gate means in one direction, and pressure means overcoming said spring means to move said gate means in the opposite direction.

2. In a hydraulic power transmission device, the combination comprising, a driven spindle, a rotor carried by and fixed for coaxial rotation with said spindle, a cylindrical hydraulic vessel journalled on said driven spindle and surrounding said rotor, a power take-off pulley on said vessel and hydraulic means for supplying variable reduced speed torque from said spindle to said vessel, said hydraulic means comprising pressure chamber means between said rotor and said vessel, said pressure chamber means comprising side walls carried by said vessel, a plurality of spaced, radially slidable vanes in said rotor between said side walls, one of said side walls having means for admitting fluid to said pressure chamber means, the other of said side walls having turbine reaction ducts allowing discharge of liquid from said pressure chamber means, and valve gate means rotatable about the axis of said rotor to close one or more of said ducts for changing the rotary speed of said vessel with respect to that of the driven rotor.

3. The hydraulic power transmission device according to claim 2 wherein said gate means comprise a gate ring co-axially mounted on said spindle and having offset, angularly-spaced arcuate gate surfaces slidable rotatably into closed, covering relationship with respect to said ducts, resilient means urging said gate surfaces into open, uncovering position, a piston fixed to said gate ring, an annular chamber in said vessel in which said piston is slidable, and duct means interconnecting said annular chamber with said pressure chamber means for urging said gate ring in the direction of covering of said gate surfaces with respect to said ducts against the urging of said resilient means.

4. The hydraulic power transmission device according to claim 2 wherein said gate means comprises a gate ring coaxially mounted on said spindle and having off-set, angularly-spaced arcuate gate surfaces slidable rotatably into closed, covering relationship with respect to said ducts, and means for controlling the position of said gate surfaces in the amount of covering of said ducts as a function of the pressure in said pressure chamber means.

5. The hydraulic power transmission device according to claim 3 including a relief valve in said annular chamber and means for controlling the pressure at which said relief valve operates manually while said vessel is in motion, whereby the pressure operating upon said piston will be changed to change the position of said gate ring and thereby change the relative speed of rotation between said rotor and said vessel.

6. In a hydraulic power transmission device, the combination comprising, a driven spindle, a rotor carried by and fixed for coaxial rotation with said spindle, a cylindrical hydraulic vessel journalled on said driven spindle and surrounding said rotor, a power take-off pulley on said vessel, a plurality of spaced vanes, radially slidable in said rotor, side walls carried by said vessel and cooperative with said rotor to provide eccentric pressure chambers within which vanes move under rotational and centrifugal forces, turbine reaction ducts in one of said side walls for discharging liquid from said pressure chambers, a gate slidable rotatably against said ducts for variably closing said ducts in accordance with the relative rotary position of said gate with respect to said ducts, resilient means urging said gate into open position with respect to said ducts, piston means fixed to said gate, an annular pressure chamber means in said vessel, said piston means being slidable in said annular pressure chamber means and conduit means interconnecting said annular pressure chamber means with said eccentric pressure chambers for urging said gate into closing position with respect to said ducts, a relief valve in said annular pressure chamber means, and means for controlling the pressure at which said relief valve operates manually while said vessel is in rotation, whereby the pressure operating upon said piston means will be changed to change the position of said gate and thereby change the relative speed of rotation between said rotor and said vessel.

7. A hydraulic power transmission device as defined in claim 6, including liquid passage means to said pressure chambers in the other of said side walls, and a liquid reservoir connected to said passage means and to said pressure chambers to increase the volume of flow of liquid at the point of admission into said pressure chambers.

8. A hydraulic power transmission device as defined in claim 6 including a scoop blade secured to said rotor adjacent to each of the vanes of said rotor, said scoop blades being operative upon rotation of said rotor to force liquid from said vessel into said pressure chamber.

References Cited in the file of this patent

UNITED STATES PATENTS

| | | |
|---|---|---|
| 1,474,007 | Sides et al. | Nov. 13, 1923 |
| 1,529,061 | Gordon | Mar. 10, 1925 |
| 1,533,877 | McCormick | Apr. 14, 1925 |
| 1,806,652 | Sperry | May 26, 1931 |
| 1,972,602 | Robbins | Sept. 4, 1934 |
| 2,313,049 | Cook | Mar. 9, 1943 |
| 2,326,567 | Root | Aug. 10, 1943 |
| 2,372,357 | Cook | Mar. 27, 1945 |
| 2,502,364 | Bannister | Mar. 28, 1950 |
| 2,511,135 | Torrance | June 13, 1950 |